No. 813,630. PATENTED FEB. 27, 1906.
C. ELLIS.
HEAT REGENERATOR FOR CEMENT KILNS.
APPLICATION FILED APR. 18, 1905.

2 SHEETS—SHEET 1.

WITNESSES: INVENTOR

No. 813,630.

PATENTED FEB. 27, 1906.

C. ELLIS.
HEAT REGENERATOR FOR CEMENT KILNS.
APPLICATION FILED APR. 18, 1905.

2 SHEETS—SHEET 2.

WITNESSES:

INVENTOR

UNITED STATES PATENT OFFICE.

CARLETON ELLIS, OF NEW YORK, N. Y., ASSIGNOR TO COMBUSTION UTILITIES COMPANY, OF NEW YORK, N. Y., A CORPORATION OF NEW YORK.

HEAT-REGENERATOR FOR CEMENT-KILNS.

No. 813,630.  Specification of Letters Patent.  Patented Feb. 27, 1906.

Application filed April 18, 1905. Serial No. 256,246.

*To all whom it may concern:*

Be it known that I, CARLETON ELLIS, a citizen of the United States, and a resident of New York city, in the county of New York and State of New York, have invented certain new and useful Improvements in Heat-Regenerators for Cement-Kilns, of which the following is a specification.

This invention relates to apparatus for the regeneration or recuperation of a portion of the sensible heat which is now lost at the stack in the manufacture of Portland-cement clinker by the rotary-kiln process. As is well known, the gases leaving the upper part of the rotary kiln are at a high temperature and carry in the form of sensible heat a very large portion of the total heat generated by the fuel.

It is the object of this invention to recover a large portion of the heat ordinarily lost in this manner by means of regenerative devices, as are hereinafter shown.

Figure 1:
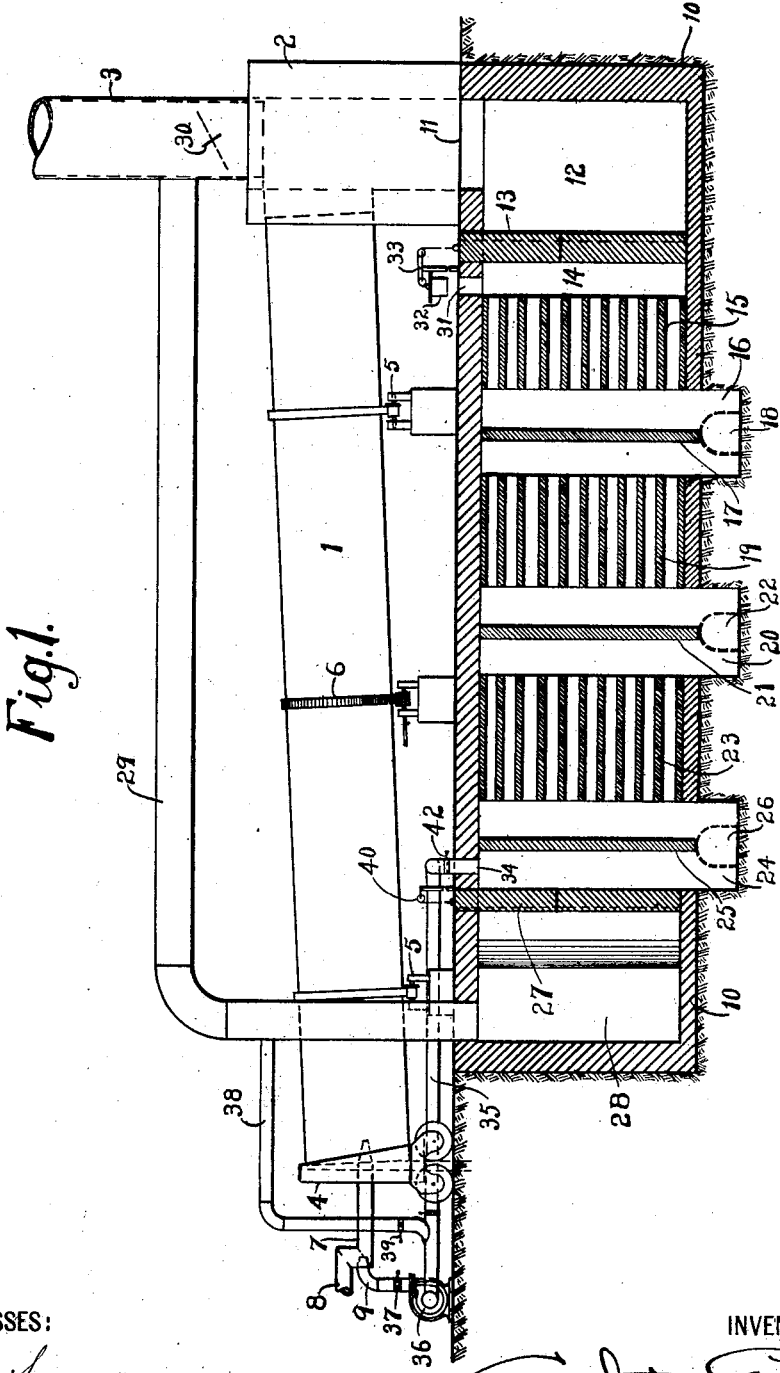
Figure 2:
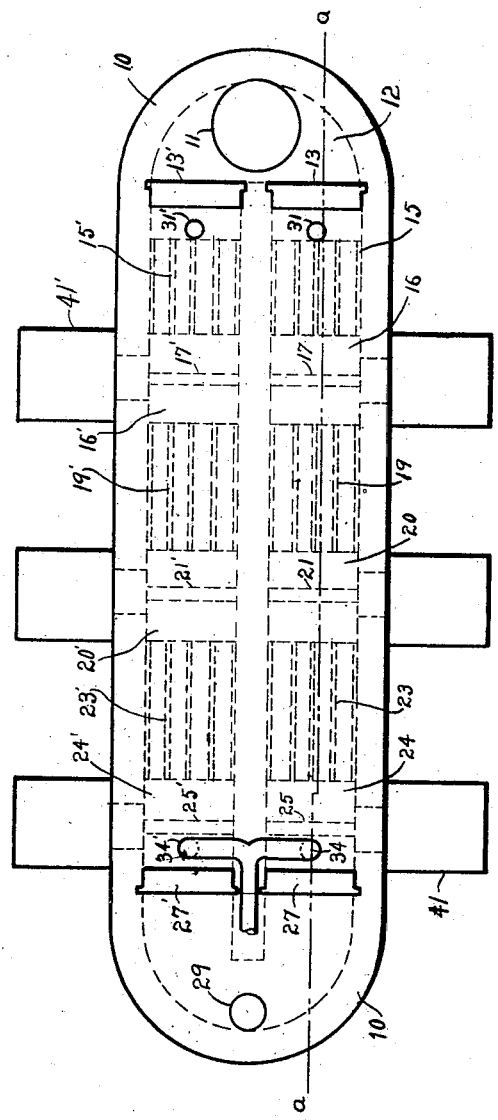
Figure 3:
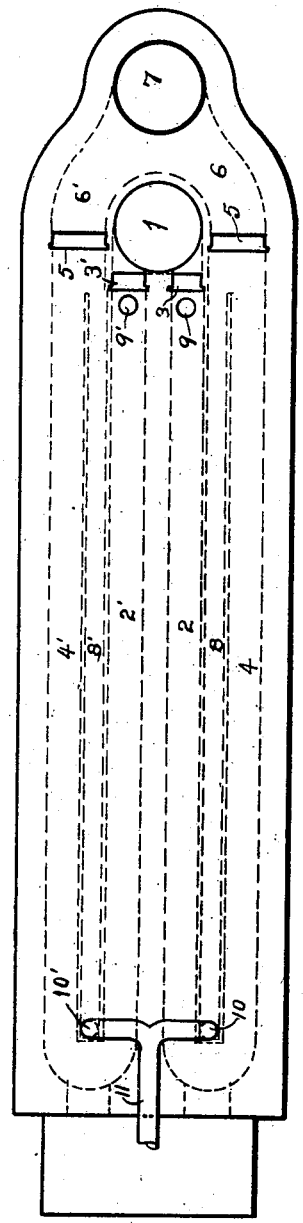

In the accompanying drawings, Figure 1 shows a longitudinal elevation of a rotary kiln and a section of a regenerating device, taken along the lines *a a* of Fig. 2. Fig. 2 is a plan view of the regenerators shown in section of Fig. 1 and is taken along the floor-line of Fig. 1. Fig. 3 represents a modified form of regenerator which may be attached to the kiln shown in Fig. 1.

Referring to Fig. 1, 1 is a rotary kiln having the housing 2 in its upper part, on which is situated the stack 3. 4 is a header inclosing the lower part of the kiln and is provided with apertures for the introduction of fuel and for the discharge of the burned clinker. The kiln rests on the rollers 5 and is rotated by the mechanism 6. 7 is a fuel-feed pipe for the admission of powdered coal, oil, or gas used in burning the cement. It is shown in a form particularly adapted for the burning of powdered coal, this fuel being admitted at 8 and air being admitted through the pipe 9. 10 is a heat-regenerative system having two sets of chambers or parts symmetrically arranged, as shown in Fig. 2. 11 is an opening in the lower part of the housing 2, by which the hot products of combustion may enter into the chamber 12. 13 is a damper which may be raised to permit the products of combustion to pass through the chamber 14. At 15 are shown ribs of refractory material forming comparatively narrow heat-retaining passages and walls. 16 is a comparatively large dust-chamber having the baffle 17 extending vertically to its upper part. In the lower part a door and passage 18 are provided for the removal of dust. At 19 are shown additional ribs; at 20 a second dust-chamber having the baffle 21 and the means for dust removal 22. Similarly, 23 represents a third set of ribs or flues; 24, another settling-chamber; 25, a baffle, and 26 a cleaning-out opening. A damper 27 allows passage of the products of combustion into the chamber 28. 29 is a passage or pipe extending from said chamber to the stack 3. 30 is a damper placed below the entrance of passage 29 into the stack. By adjusting this damper products of combustion may be sent downwardly into the regenerators and finally through 29 into the stack above the damper. 31 is an air-inlet into the chamber 14, which may be closed by the plug 32. It is arranged on the mechanism 33 in such a manner that the closure of the opening 32 causes the damper 13 to rise, thereby forming a passage between the chambers 12 and 14. In the chamber 24 is situated an air-outlet 34, from which extends the pipe or passage 35 to the fan 36. A damper 42 is placed in this passage. The fan exhausts into the pipe 9, in which is placed a damper 37. 38 is a conduit or passage extending from the chimney-flue 29 to the passage 35, allowing of the use of products of combustion, if desired. 39 is a gate controlling this supply. The damper 27 is operated by the mechanism 40. All the dampers and gates in question may be so connected and arranged that they may be operated from the lower part of the kiln by means of levers or other operating devices.

In Fig. 2 the symmetric arrangement of the regenerators is shown. 11 is the opening from the housing 2 (shown in Fig. 1) into the chamber 12. 13 and 13' are the vertical dampers above mentioned. 15 15' 19 19' 23 23' are the horizontal ribs or passages of refractory material used as heat-retaining walls. 16 16' 20 20' 24 24' are the dust-chambers aforesaid. 17 17' 21 21' 25 25' are dust-baffles. 27 and 27' are dampers; 29, the chimney-flue inlet. 31 and 31' are cold-air inlets; 34 and 34', hot-air outlets. 41 and 41' are pits for removal of the dust.

In Fig. 3, 1 is the opening in the housing at the head of the kiln, through which the products of combustion pass downwardly into the regenerative flues. 2 and 2' are flues extending toward the foot or clinker-discharge end of the kiln. Near the aperture 1 are placed the vertical dampers 3 and 3', corresponding to the dampers 13 and 13' in Figs. 1 and 2. 4 and 4' are return-passages for the products of combustion, by which they pass into the flues 6 and 6' in to the stack 7. 5 and 5' are dampers similar in nature to those shown at 3 and 3', which serve to regulate the flow of the heated gases. Between the passages 2 and 4 and 2' and 4' is a passage 8 and 8', having thin walls. Cold-air inlets are shown at 9 and 9' and heated-air outlets at 10 and 10'. A collecting-pipe for the heated air is shown at 11.

In the operation of the apparatus illustrated in Fig. 1 powdered coal or other fuel is fed into the feed-pipe 7 and is burned in the kiln 1. The products of combustion pass into the housing 2. At that point by the regulation of the damper 30 they may either pass up the stack in whole or in part or may in whole or in part pass downwardly into the regenerator 10 or 10'. Ordinarily such portion of the products of combustion as is needed to highly heat the regenerator is passed into one set of regenerators. Suppose, for instance, that products of combustion are being conducted into the regenerator 10. This will necessitate opening the damper 13, thereby closing the air-inlet 31. The products of combustion will pass in contact with the refractory surfaces 15, 19, and 23 and through the dust-chambers 18, 20, and 24 and on leaving the last dust-chamber will pass through the opening produced by raising damper 27 into the chamber 28 and from thence by means of stack-passage 29 into the stack 3. In the opposite set of regenerators by reference to Fig. 2 it will be evident that for the passage of air therethrough the damper 13' should be closed and the air-inlet 31' opened. The damper 42 is closed, while a corresponding damper on the opposite side (not shown in the drawings but situated on the rising part of pipe 34') is opened. The fan-blower 36 causes a current of air to pass through that regenerator which has been previously heated by the passage therethrough of products of combustion in the manner described in the case of the operation of the regenerator 10. When the regenerator 10' has become cooled to such an extent that the air passing therethrough is no longer sufficiently heated, the operation may be reversed, causing the flow of products of combustion through this regenerator and causing the air to flow through regenerator 10.

It is not necessary to have the fan-blower 36 situated so that the air is induced through the regenerators. It may be placed at the opposite end of the regenerator and forced through the passage 31. Any other form of a mechanical blast appliance or draft-producing means may be employed. The arrangement of the refractory walls and surfaces in the regenerators may be varied according to conditions. A vertical arrangement of the refractory surfaces or ribs may in some cases be better, owing to the fact that such a construction facilitates the removal of dust.

The regenerator illustrated in Fig. 3 may be operated as follows: Products of combustion are passed downwardly through the aperture 1 into the passage 2. The damper 3 being raised, the heated gases pass around the walls of the flue 8 into the flue 7 and from thence by opening the damper 5 into the passage 6 to the stack 7. Simultaneously the damper 3' is closed while the air-inlet 9' is open and air is drawn or forced through the regenerative or heating flues 2', 4', and 8' and from thence through the outlet 10' into the passage 11. It may be taken at that point to the kiln and used for accelerating or intensifying combustion. The flues 8 and 8' may be of thin refractory material, or, if desired, they may be of metal.

I do not limit myself to the constructional features herewith shown, as various modifications of my apparatus may be made without departing from the scope of this invention.

What I claim is—

1. A cement-making apparatus comprising a kiln and a regenerative air-heater therefor abstracting waste gases from the kiln and provided with a succession of alternating constricted and expanded passages, the latter passages being provided with dust-removing doors.

2. A cement-making apparatus comprising a kiln and a regenerative air-heater therefor abstracting waste gases from said kiln and provided with a plurality of dust-collecting chambers and a plurality of regenerative devices, successively and alternately arranged.

3. A cement-making apparatus comprising a kiln and a regenerative air-heater therefor abstracting waste gases from said kiln and provided with a plurality of dust-collecting chambers alternating with constricted passages lined with refractory materials.

4. A cement-making apparatus, comprising a kiln and a regenerative air-heater therefor abstracting waste gases from said kiln and provided with a plurality of successive regenerative devices alternating with dust settling and collecting chambers containing baffle-plates.

5. A cement-making apparatus comprising a kiln, a housing for the gas-exit end thereof, a chimney-stack connected to the housing, a regenerative air-heater also connected to the housing at a point remote from the main draft therethrough and abstracting a portion of the waste gases from said housing and means for collecting and settling dust in said regenerative air-heater.

6. In a cement-making apparatus, the combination of a kiln, air-feeding means, fuel-feeding means, a regenerative air-heater heated by waste gases from the kiln and means for withdrawing a portion of said gases after passing through the heater and adding said portion to the heated air.

7. A cement-making apparatus comprising a kiln and a regenerative air-heater therefor, said heater containing a series of tiers of heat-absorbing bodies arranged with passages therebetween and said tiers being spaced apart to form dust-settling chambers.

8. A cement-making apparatus comprising a kiln and a regenerative air-heater therefor, said heater containing a series of tiers of heat-absorbing bodies arranged with passages therebetween, said tiers being spaced apart to form dust-settling chambers, and baffle-plates in said chambers.

Signed at New York city, in the county of New York and State of New York, this 17th day of April, A. D. 1905.

CARLETON ELLIS.

Witnesses:
WARREN E. DIXON,
A. M. SENIOR.